United States Patent [19]

Smith

[11] Patent Number: 4,617,501

[45] Date of Patent: Oct. 14, 1986

[54] CONTROL AND SAFETY SYSTEM FOR ELECTRICALLY POWERED SUBMERSIBLE TOOLS AND LIGHTS

[75] Inventor: Franklin W. Smith, King County, Wash.

[73] Assignees: John D. Gieser; Douglas Foreman, both of Bellevue, Wash.

[21] Appl. No.: 777,845

[22] Filed: Sep. 19, 1985

[51] Int. Cl.$^4$ .............................................. H02H 3/20
[52] U.S. Cl. .................................... 318/459; 318/782; 318/813; 361/91
[58] Field of Search ............... 318/459, 808, 812, 813, 318/782; 361/56, 90, 91; 310/50, 87

[56] References Cited

U.S. PATENT DOCUMENTS

| | | | |
|---|---|---|---|
| 2,445,976 | 7/1948 | Sola | 318/813 X |
| 2,862,122 | 11/1958 | Courtin et al. | 310/87 |
| 2,964,660 | 12/1960 | Herrick et al. | 310/87 |
| 3,130,676 | 4/1964 | Beaulieu | 310/87 |
| 3,210,577 | 10/1965 | Hogue | 310/43 |
| 3,246,186 | 4/1966 | Schaefer | 310/87 |
| 3,275,862 | 9/1966 | Kren | 310/87 |
| 3,319,093 | 5/1967 | Abdul | 310/50 |
| 3,325,659 | 6/1967 | Douglas | 310/50 |
| 3,392,319 | 7/1968 | McColl et al. | 363/129 |
| 3,555,383 | 1/1971 | Hackman et al. | 318/782 |
| 3,664,438 | 5/1972 | Winget et al. | 175/6 |
| 4,036,199 | 7/1977 | Chateau | 361/91 X |
| 4,236,187 | 11/1980 | Mochizuki et al. | 361/91 X |

FOREIGN PATENT DOCUMENTS

| | | | |
|---|---|---|---|
| 58-44365 | 3/1983 | Japan | 361/91 |
| 0892433 | 2/1981 | U.S.S.R. | 361/91 |

OTHER PUBLICATIONS

J. Jursik, "Overload Protection Circuit", IBM Technical Disclosure Bulletin, vol. 4, No. 10, Mar. 1962, p. 50.

Primary Examiner—Vit W. Miska
Assistant Examiner—Bentsu Ro
Attorney, Agent, or Firm—Seed and Berry

[57] ABSTRACT

A control system for electrically powering from an external alternating-current power source a direct-current underwater hand-operated tool or light activated by a switch. The control system includes a relay for connecting and disconnecting the external AC power source to and from the system, a transformer connected to the relay for transforming the AC power to a desired lower voltage level, a converter connected to the transformer for converting the transformed AC to DC power, cables for supplying the DC power to the tool, and a control circuit for sensing the voltage level of the transformed AC power and in response to the sensed voltage level increasing beyond a predetermined safe level, causing the relay to disconnect the external AC power source from the system. The control includes a Zener diode for sensing the voltage level of the transformer AC power, and a transistor and an SCR for controlling the operation of the relay. The transistor is responsive to the conductive state of the SCR and provides drive to the coil of the relay. When the sensed voltage level of the transformed AC power increases above the predetermined level, the SCR is placed in a conductive state, inhibiting base drive to the transistor to deactivate the relay coil and open the relay for disconnecting the external AC power source from the system.

25 Claims, 4 Drawing Figures

CONTROL AND SAFETY SYSTEM FOR ELECTRICALLY POWERED SUBMERSIBLE TOOLS AND LIGHTS

DESCRIPTION

1. Technical Field

The present invention relates generally to control systems for electrically powering a direct-current submersible tool form an external alternating-current power source, and more particularly, to a control system for safely delivering low-voltage, high-current, DC power to submersible hand-operated electric tools. The invention also relates to powering a submersible electric light.

2. Background Art

While it is desirable to use electrically powered, submersible, hand-operated tools and lights, there is a clear and always present danger that the electrical power will cause injury to the user while in the water. To reduce this danger, it is desirable to use low-voltage, direct-current power for tools; however, should a failure occur in the system which results in high-voltage power being conducted through the water to the user of the tool, the user will be severely injured or killed. With such severe consequences, there is a natural reticence to use electrically powered, submersible hand-operated tools or lights.

It will therefore be appreciated that there has been a significant need for a control system which avoids the aforementioned problems and provides an electric, hand-operated tool and light, powered from an external alternating-current power source, which may be safely operated under the water. The present invention fulfills this need and further provides other related advantages.

DISCLOSURE OF INVENTION

The present invention resides in a control system for electrically powering from an external alternating-current power source a hand-operated direct-current submersible tool or light activated by a control switch. The control system includes a power switching means selectively controllable for connecting and disconnecting the external alternating-current power source to and from the system; transformer means connected to the power switching means for transforming the alternating-current power of the source to a desired lower voltage level; converter means connected to the transformer means for converting the transformed alternating-current power to direct-current power; conductive means for supplying the direct-current power to the tool; and control means for sensing the voltage level of the transformed alternating-current power, and in response to the sensed voltage level increasing above a predetermined level, controlling the power switching means to disconnect the alternating-current power source from the system. With the control system, the lower voltage transformed alternating current is monitored and used to control the application of the higher voltage of the external alternating-current power source to the system to prevent overvoltages on the output of the transformer means and thus the tool. The power switching means is selectively controllable responsive to the control switch of the tool to connect and disconnect the external alternating-current power source to and from the system. As such, the power switching means is also used for controlling normal on/off operation of the tool.

The control means includes a sensor means for sensing the voltage level of the transformed alternating-current power of the transformer means, and switch means responsive to the sensor means for controlling the power switching means. The switch means disconnects the external alternating-current power source from the system in response to the sensor means sensing the voltage level of the transformed alternating-current power increasing above the predetermined level.

The switch means includes a transistor and a silicon-controlled rectifier. The transistor is responsive to the conductive state of the silicon-controlled rectifier and controls the operation of the power switching means by providing drive thereto. The silicon-controlled rectifier is held in a nonconductive state when the voltage level of the transformed alternating-current power is below the predetermined level and the transistor, in response thereto, controls the power switching means to connect the external alternating-current power source to the system. The silicon-controlled rectifier is placed in a conducting state when the sensed voltage increases above the predetermined level and the transistor, in response thereto, controls the power switching means to disconnect the external alternating-current power source from the system. The silicon-controlled rectifier is held in the conducting state until reset to the nonconductive state. The switch means includes a manually operable reset switch connected to the silicon-controlled rectifier for resetting it.

In the presently preferred embodiment of the invention, the sensor means is a Zener diode and the gate of the silicon-controlled rectifier is connected across the transformed alternating-current power. The Zener diode is selected with a breakdown voltage to provide sufficient voltage on the gate of the silicon-controlled rectifier to place it in the conducting state when the voltage level of the transformed alternating power increases above the predetermined level.

The control system further includes a second transistor responsive to the control switch of the tool and connected to the first transistor. The second transistor is held in a conductive state when the control switch is positioned to turn off the tool and places the first transistor into the nonconducting state to eliminate drive to the power switching means and thereby maintain the external alternating-current power source disconnected from the system. The second transistor is placed into a nonconductive state when the control switch is positioned to turn on the tool and permits the first transistor to go to a conducting state to provide drive to the power switching means. As such, the control switch controls the on/off operation of the tool by switching the external alternating power source rather than the direct-current power to the tool.

The control system further includes means for inhibiting low-current transients on the alternating-current power output of the transformer means with voltage levels above the predetermined level. This prevents the control means from sensing the transients, and in response thereto, disconnecting the external current power source from the system.

Other features and advantages of the invention will become apparent from the following detailed description, taken in conjunction with the accompanying drawings.

BEST MODE FOR CARRYING OUT THE INVENTION

As shown in the drawings for purposes of illustration, the present invention is embodied in a system, indicated generally by the reference numeral 10, for safely delivering low-voltage, high-current DC power to a submersible, electric, hand-operated tool 12. The basic system 10 is shown in functional block diagram form in FIG. 2 and powered by an AC power source 14. The system 10 includes a relay 16, a transformer 18, an AC-to-DC converter 20, a control circuit 22, a power supply 24 for the control circuit, and an external trigger 26 at the tool 12. The AC power source 14 applies conventional 115-volt, 60-cycle power through the contacts of the relay 16 to the transformer 18. The transformer steps down the power from the 115 volts to 20 volts AC and supplies the power to the converter 20. The converter 20 converts the power from 20 volts AC to 20 volts DC and supplies the power directly to the submersible tool 12, which may be safely hand-operated while under water. An electric light could also be powered by the present invention, using AC or DC power.

Figure 2:
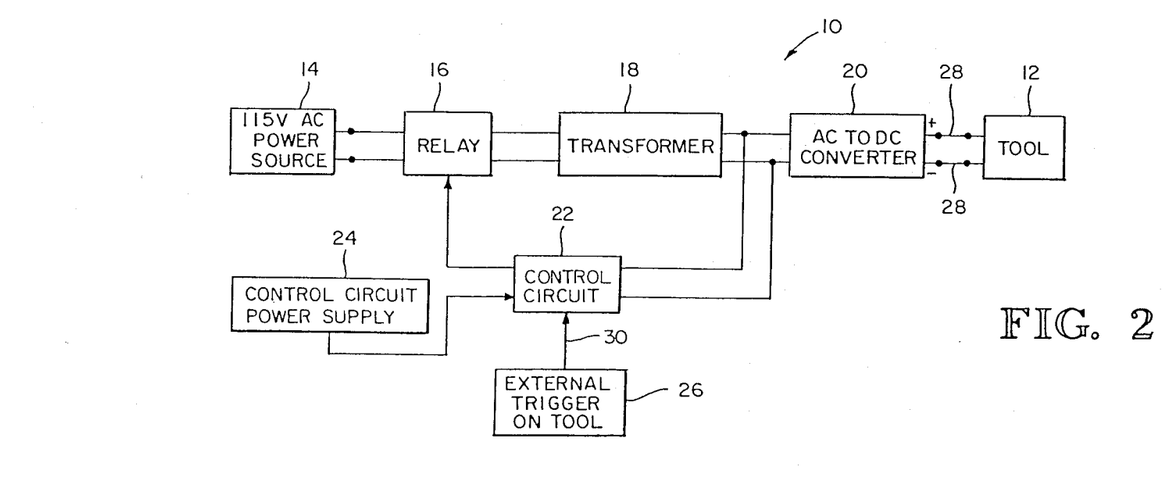
FIG. 2 is a functional block diagram of a control system embodying the present invention.

In order to provide safe operation of the tool 12, it is necessary to ensure that the voltage to the tool does not exceed a predetermined safe level. This is accomplished by the control circuit 22 sensing the low-voltage AC output of the transformer 18, and in the event that the transformer output approaches the predetermined safe level, deactivating the relay 16 to cut the high-voltage AC power to the transformer; and consequently the DC power to the tool 12. As such, any overvoltage on the output of the transformer 18 which results from a short circuit in the transformer between the primary and secondary windings, or from any other cause, will not be applied to the tool 12.

Figure 1:
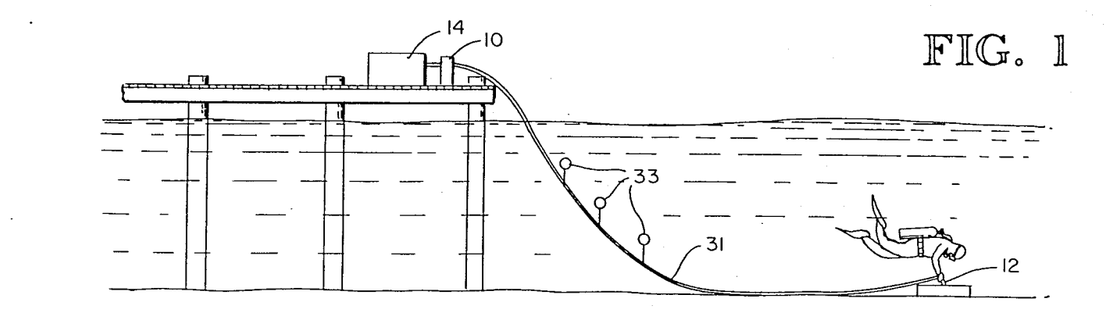
FIG. 1 is a schematic drawing showing the control system embodying the present invention in use.

The control circuit 22 is provided its own operating low-voltage DC power by the power supply 24. The external trigger 26 is generally mounted on the tool 12, and through the control circuit 22, also selectively activates and deactivates the relay 16 to cut power to the tool for normal on/off operation of the tool. In most situations, only the tool 12 and the external tool trigger 26 will be submersed in the water. Except for the high-voltage AC power source 14, which may be a conventional power line or an on-site conventional power generator, the remainder of the system 10 is contained in a weather resistant case and positioned on dry land with a pair of long cable wires 28 extending from the converter 20 to the tool 12, and another pair of long cable wires 30 extending from the control circuit 22 to the trigger 26. In FIGS. 1 and 2 the wires 28 and 30 are shown as being part of a cable 31 supported by a plurality of buoyant floats 33. The floats 33 are attached to the cable 31 by lines and provide assistance to the operator of the hand-operated tool 12 in supporting the weight of the portion of the cable in the water. As shown in more detail in FIG. 3, in the presently preferred embodiment of the invention, the high-voltage AC power source 14 has one line connected through the normally open contacts of the relay 16 to the one terminal of the primary windings 18p of the transformer 18. The other neutral line of the power source 14 is connected directly to the other terminal of the primary winding 18p of the transformer 18.

Figure 3:
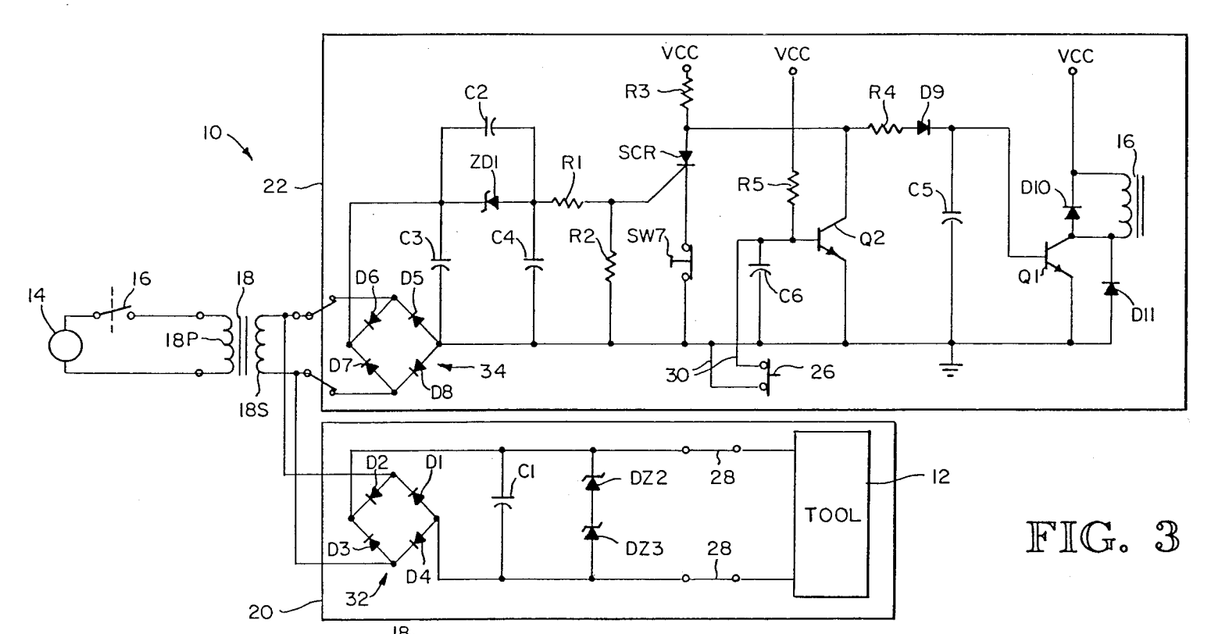
FIG. 3 is an electrical schematic diagram of the control system of FIG. 2.

The terminals of the secondary winding 18s of the transformer 18 are connected across the input of a full-wave rectifier diode bridge 32 comprised of the diodes D1–D4, and the DC output of the bridge is supplied through the cable 28 to the tool 12. A capacitor C1 is connected across the output of the bridge 32 to filter noise and smooth the waveform of the DC output voltage. Also connected across the output of the bridge 32 are two in-series Zener diodes ZD2 and ZD3 to eliminate any low-current, high-voltage spikes which might interfere with the control circuit 22 by causing a false high-voltage reading by the control circuit and result in deactivation of the relay 16.

The terminals of the secondary winding 18s of the transformer 18 are also connected to the input of a second full-wave rectifier diode bridge 34 in the control circuit 22, comprised of the diodes D5–D8. A supply voltage VCC is supplied by the power supply 24 to the control circuit 22.

The circuitry of the control circuit 22 and its operation will now be described, again with reference to the detailed schematic drawing of FIG. 3. As previously described, the output of the transformer 18 is connected to the control circuit 22 across the input of the full-wave rectifier bridge 34, which produces a DC check voltage on the output of the bridge directly corresponding to the amplitude of the AC low-voltage input to the converter 20.

The negative output terminal of the bridge 34 is grounded, and the positive output terminal of the bridge is connected to the cathode of a Zener diode ZD1. The anode of the Zener diode ZD1 is connected to ground through a voltage divider comprised of the resistors R1 and R2, and the junction point of the resistors R1 and R2 is connected to the gate of a silicon-controlled rectifier SCR. The Zener diode ZD1 has a breakdown voltage selected slightly larger than the maximum normal operating voltage level desired on the output of the transformer 18, but less than the predetermined safe maximum voltage level for the system 10.

In the presently preferred embodiment of the invention, the Zener diode ZD1 has a 24-volt breakdown voltage; and when the output voltage of the transformer 18 reaches or exceeds 24 volts, an overvoltage condition will exist and the control circuit 22 will deactivate the relay 16 and cut the high-voltage AC power from the power source 14 to the primary winding 18p of the transformer 18. More specifically, when the voltage across the Zener diode ZD1 reaches or exceeds the breakdown voltage, sufficient current will be conducted through the diode and through the voltage divider comprised of the resistors R1 and R2 to activate the SCR. The values of the resistors R1 and R2 are selected to provide a sufficient voltage on the gate of the SCR to place it in a conducting state.

The anode of the SCR is connected to supply voltage VCC through a current-limiting resistor R3, and the cathode of the SCR is connected through a manually operated, normally closed reset switch SW1 to ground. The junction point between the resistor R3 and the anode of the SCR is connected through a current-limiting resistor R4 to the anode of a diode D9. The cathode of the diode D9 is connected to the base of an NPN transistor Q1. The emitter of the transistor Q1 is connected to ground, and the collector of the transistor is connected to one terminal of the coil of the relay 16. The other terminal of the coil of the relay 16 is connected to supply voltage VCC. As previously noted, the relay 16 has a pair of normally open contacts, with one contact connected to one line of the power source 14 and the other contact connected to one terminal of the transformer 18 to selectively switch high-voltage AC power to and from the primary winding 18p of the transformer.

When the voltage on the secondary winding 18s of the transformer 18 is at or below the maximum normal operating voltage level, and hence the DC check voltage on the output of the bridge 34 is below the breakdown voltage of the Zener diode ZD1, the SCR is in a nonconducting state. When the SCR is in such a nonconducting state and the external trigger 26 is in a closed position for operation of the tool 12, a base drive current is supplied to the transistor Q1 from the power supply VCC through resistors R3 and R4 and the diode D9 to place the transistor in a conducting state. When conducting, the transistor Q1 acts as a switch and conducts sufficient collector current from the power supply VCC through the coil of the relay 16 to activate the relay and close the relay contacts, thus switching the high-voltage AC power to the primary winding 18p of the transformer 18.

Should the voltage AC output of the secondary winding 18s of the transformer 18 increase toward the predetermined safe level sufficiently for the DC check voltage to exceed the breakdown voltage of the Zener diode ZD1, the SCR will be placed in a conducting state. When the SCR is in such a conducting state, the junction point of the resistors R3 and R4 will drop almost to ground and eliminate base drive to the transistor Q1. As such, the transistor Q1 will turn off and no further current will be conducted through the coil of the relay 16. When so deactivated, the contacts of the relay 16 move to the normally open position and the high-voltage AC power is disconnected from the primary winding 18p of the transformer 18. In summary, the system 10 senses the low-voltage AC power output of the transformer 18 and responds to an overvoltage condition by switching the high-voltage AC power. Switching of DC voltage is avoided.

The diode D9 is provided to compensate for the voltage drop across the SCR which occurs when in a conducting state and places a slightly positive voltage on the junction point of the resistors R3 and R4. Since the inherent voltage drop across the diode D9 is substantially equal to that of the SCR, the base of the transistor Q1 is held at approximately ground when the SCR is conducting. This securely holds the transistor Q1 in a latched "off" state until the SCR is reset.

Because of the sensitivity of the overvoltage-sensing portion of the control circuit 22, it is necessary to eliminate high-voltage noise on the low-voltage AC power signal which might falsely trip the control circuit and switch off the power to the tool 12. Such noise may be the result of low-current, high-voltage spikes coming through the power lines or from the on-site power generator comprising the power source 14, or caused by inductive loads of other equipment operating from the same power source, or by the operation of the tool 12 itself. Similarly, it is preferred to filter noise which may come through the power supply 24 on the supply voltage VCC. Noise on the low-voltage AC power signal is filtered by a capacitor C2 bridging the Zener diode D1, by a capacitor C3 connected between the cathode of the Zener diode ZD1 and ground, and by a capacitor C4 connected between the anode of the Zenner diode ZD1 and ground. The capacitance values for the noise-filtering capacitors C2, C3 and C4 are selected with a sufficiently low value that they have no appreciable effect on the response time of the Zener diode ZD1 to voltage increases in the low-voltage AC power resulting from an overvoltage condition. Noise from the power supply 24 is filtered by a capacitor C5 connected between the cathode of the diode D9 and ground.

Once an overvoltage condition has caused the SCR to be placed in a conducting state and the contacts of the relay 16 to be opened, the SCR will continue conducting and hold the transistor Q1 latched in an "off" state. This maintains the relay 16 deactivated until the reset switch SW7 is manually opened to break the conduction path between the cathode of the SCR and ground and return the SCR to a nonconducting state. When the SCR has been returned to the nonconducting state, the base drive current to transistor Q1 will commence again (assuming the trigger 26 is in a closed position for operation of the tool 12), and the relay 16 will be activated. Thus, the high-voltage AC power will be connected to the transformer 18 and low-voltage DC power will be supplied to the tool 12. The control circuit 22 is immediately ready to sense another overvoltage condition.

To this point, the control circuit 22 has been described as if the external trigger 26 were in a closed position for operation of the tool 12. Under normal operating circumstances, the SCR is in a nonconducting state and DC power to the tool 12 is selectively controlled by operation of the trigger 26.

The trigger 26 is a normally open switch; and when closed to operate the tool 12, the switch connects the base of an NPN transistor Q2 to ground. The base of the transistor Q2 is also connected through a resistor R5 to supply voltage VCC. The collector of the transistor Q2 is connected to the junction point of the resistors R3 and R4, and the emitter of the transistor is connected to ground.

With the trigger 26 closed to operate the tool 12, the base of the transistor Q2 is grounded and the transistor Q2 is turned off. As such, base drive to the transistor Q1 is provided through the resistors R3 and R4 to maintain the transistor Q1 in a conducting state and the relay activated to connect the high-voltage AC power to the transformer 18 and DC power to the tool 12.

When the operator releases the trigger 26, the trigger returns to its normally open position and removes the ground from the base of the transistor Q2. At such time, base drive is provided to the transistor Q2 through the resistor R5 and the transistor Q2 is placed in a conducting state. The transistor Q2 holds the junction point of the resistors R3 and R4 substantially at ground and eliminates the base drive to the transistor Q1, much as did the SCR when placed in the conducting state as a result of an overvoltage condition. As previously described, with the transistor Q1 turned off, the relay 16 is deactivated and the high-voltage AC power is disconnected from the transformer 18, and hence the DC power to the tool 12 is turned off.

When the operator again desires to operate the tool, he closes the normally open trigger 26 and again turns off the transistor Q2 by placing the ground on the transistor's base, and allows base drive to the transistor Q1. The relay 16 is again activated and high-voltage AC power is connected to the transformer 18, and hence DC power to the tool 12 is turned on. Unlike the SCR, the transistor Q2 may be readily turned on and off by the operation of the trigger 26 without latching of the transistor Q1 in the "off" state.

It is noted that until an overvoltage condition again occurs, the SCR will remain in a nonconducting state and the trigger controls normal on/off operation of the tool 12. Should the operator be holding the trigger 26 in a closed position in an attempt to operate the tool 12, thus placing the transistor Q2 in an "off" condition, and an overvoltage condition is sensed which places the SCR in a conducting state, the voltage on the junction point between the resistors R3 and R4 will be controlled by the SCR. Regardless of the position of the trigger 26, the SCR will turn off the transistor Q1 and latch it in the "off" state, and thus hold the relay 16 deactivated.

Figure 4:
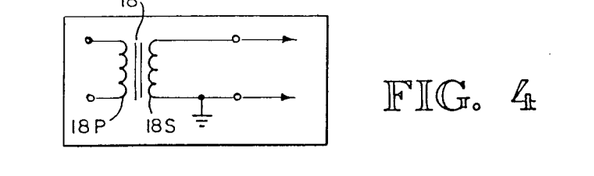
FIG. 4 is a second embodiment for the transformer shown in FIG. 3.

For filtering of noise, a capacitor C6 is provided between the base of the transistor Q2 and ground. To protect the transistor Q1 from spikes which could result when the relay 16 is activated or deactivated, a diode D10 has its anode connected to the collector of the transistor Q1 and its cathode connected to supply voltage VCC to place it across the coil of the relay 16. Also provided is a diode D11 with its cathode connected to the collector of the transistor Q1 and its anode connected to ground. In a second embodiment for the transformer 18, shown in FIG. 4, the one terminal of the secondary winding 18s is grounded.

In the presently preferred embodiment of the invention, conventional components are employed throughout, and the following values of resistance, capacitance, voltage, and power rating may be used. It will be understood by those having ordinary skill in the art to which the present invention pertains that the invention is not limited to circuitry using the specific values set forth herein.

VALUES FOR ONE PREFERRED EMBODIMENT

R1—5 k ohms
R2—10 k ohms
R3—0.5 k ohms
R4—5 k ohms
R5—3 k ohms

C1—144,000 microfarrad
C2—0.1 microfarrad
C3—0.165 microfarrad
C4—0.01 microfarrad
C5—0.1 microfarrad
C6—1 microfarrad ZD1—24 volts
ZD2—12 volts, 10 watts
ZD3—12 volts, 10 watts D1-D4—50 volts, 200 amp
D5-D8—200 volts, 1 amp
D9-D11—100 volts, 1 amp
DZ2—12 volts, 10 watts
DZ3—12 volts, 10 watts SCR—1.7 amps, 100 volts Relay 16—12 volts DC It will be appreciated that, although specific embodiments of the invention have been described herein for purposes of illustration, various modifications may be made without departing from the spirit and scope of the invention. Accordingly, the invention is not limited except by the appended claims.

I claim:

1. A control system for electrically powering from an external alternating-current power source, a hand-operated, submersible light or tool activated by a control switch, comprising:

power switching means selectively controllable responsive to the control switch of the light or tool for connecting and disconnecting the external alternating-current power source to and from the system;

transformer means connected to said power switching means for transforming the alternating current power of the source to a desired lower voltage level;

conductive means for supplying the power to the tool; and control means for sensing the voltage level of the transformed alternating-current power, and in response to the sensed voltage level increasing above a predetermined level, for controlling said power switching means to disconnect the external alternating-current power source from the system, whereby the lower voltage alternating-current output of said transformer means is monitored and used to control the application of the higher voltage alternating-current to the system to prevent overvoltages on the output of said transformer means and thus the light or tool.

2. The control system of claim 1 wherein said control means holds said power switching means latched into a state disconnecting the external alternating-current power source from the system until manually reset.

3. The control system of claim 1 wherein said control means includes sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level.

4. The control system of claim 1, further including means for inhibiting low-current transients on the transformed alternating-current power of said transformer means with voltage levels above said predetermined level to prevent said control means from sensing such transients and in response thereto disconnecting the external current power source from the system.

5. A control system for electrically powering from an external alternating-current power source, a hand-operated, direct-current submersible tool activated by a control switch, comprising:

power switching means selectively controllable responsive to the control switch of the tool for connecting and disconnecting the external alternating-current power source to and from the system;

transformer means connected to said power switching means for transforming the alternating current power of the source to a desired lower voltage level;

rectifier means connected to said transformer means for rectifying the transformed alternating-current power to direct-current power;

conductive means for supplying the direct-current power to the tool; and control means for sensing the voltage level of the transformed alternating-current power, and in response to the sensed voltage level increasing above a predetermined level, for controlling said power switching means to disconnect the external alternating-current power source from the system, whereby the lower voltage alternating-current output of said transformer means is monitored and used to control the application of the higher voltage alternating-current to the system to prevent overvoltages on the output of said transformer means and thus the tool.

6. The control system of claim 5 wherein said control means holds said power switching means latched into a state disconnecting the external alternating-current power source from the system until manually reset.

7. The control system of claim 5 wherein said control means includes sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level.

8. The control system of claim 5, further including means for inhibiting low-current transients on the transformed alternating-current power of said transformer means with voltage levels above said predetermined level to prevent said control means from sensing such transients and in response thereto disconnecting the external current power source from the system.

9. A control system for electrically powering from an external alternating-current power source, a hand-operated, direct-current submersible tool activated by a control switch, comprising:

power switching means selectively controllable for connecting and disconnecting the external alternating-current power source to and from the system;

transformer means connected to said power switching means for transforming the alternating current power of the source to a desired lower voltage level;

rectifier means connected to said transformer means for rectifying the transformed alternating-current power to direct-current power;

conductive means for supplying the direct-current power to the tool; and control means for sensing the voltage level of the transformed alternating-current power, and in response to the sensed voltage level increasing above a predetermined level, for controlling said power switching means to disconnect the external alternating-current power source from the system, said control means including sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level, said switch means including a transistor and a silicon-controlled rectifier, said silicon-controlled rectifier being held in a nonconducting state when the voltage level of the transformed alternating-current power is below said predetermined level and said transistor in response thereto controlling said power switching means to connect the external alternating-current power source to the system, and said silicon-controlled rectifier being placed into a conducting state when the sensed voltage level increases above said predetermined level and said transistor in response thereto controlling said power switching means to disconnect the external alternating-current power source from the system, said silicon-controlled rectifier being held in said conducting state until reset to said nonconducting state, whereby the lower voltage alternating-current output of said transformer means is monitored and used to control the application of the higher voltage alternating-current to the system to prevent overvoltages on the output of said transformer means and thus the tool.

10. The control system of claim 9 wherein said switch means includes a manually operable reset switch connected to said silicon-controlled rectifier for resetting said silicon-controlled rectifier.

11. The control system of claim 9 wherein the sensor means is a Zener diode connected across the transformed alternating-current power of said transformer means and the gate of said silicon-controlled rectifier is connected to said Zener diode, said Zener diode being selected with a breakdown voltage to provide sufficient voltage on the gate of said silicon-controlled rectifier to place said silicon-controlled rectifier in said conducting state when the voltage level of the transformed alternating-current power increases above said predetermined level.

12. A control system for electrically powering from an external alternating-current power source, a hand-operated, direct-current submersible tool activated by a control switch, comprising:

power switching means selectively controllable for connecting and disconnecting the external alternating-current power source to and from the system, said power switching means including a normally open relay with a relay coil;

transformer means connected to said power switching means for transforming the alternating current power of the source to a desired lower voltage level;

rectifier means connected to said transformer means for rectifying the transformed alternating-current power to direct-current power;

conductive means for supplying the direct-current power to the tool; and control means for sensing the voltage level of the transformed alternating-current power, and in response to the sensed voltage level increasing above a predetermined level, for controlling said power switching means to disconnect the external alternating-current power source from the system, said control means including sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level, said switch means including a transistor connected to said relay coil to selectively provide drive thereto and a silicon-controlled rectifier connected to the base of said transistor, said silicon-controlled rectifier being held in a nonconducting state when the sensed voltage level of the transformed alternating-current power of said transformer means is below said predetermined level and being placed into a conducting state when the sensed voltage level increases above said predetermined level, when in said nonconducting state, said silicon-controlled rectifier permitting base drive to said transistor to place said transistor in a conducting state for providing drive to said relay coil to maintain said relay closed and the external alternating-current power source connected to the system, and when in said conducting state, said silicon-controlled rectifier inhibiting base drive to said transistor to place said transistor in a nonconducting state for elminating drive to said relay coil to open said relay and disconnecting the external alternating-current power source from the system, said silicon-controlled rectifier being held in said conducting state and said transistor thereby being latched in said nonconducting state until said silicon-controlled rectifier is reset to said nonconducting state, whereby the lower voltage alternating-current output of said transformer means is monitored and used to control the application of the higher voltage alternating-current to the system to prevent overvoltages on the output of said transformer means and thus the tool.

13. The control system of claim 12, further including a second transistor responsive to the control switch of the tool and connected to the base of said first transistor, said second transistor being held in a conducting state when the control switch is positioned to turn off the tool for inhibiting base drive to said first transistor to place said first transistor in said nonconducting state, thereby eliminating drive to said relay coil, and said second transistor being placed in a nonconducting state when the control switch is positioned to turn on the tool for permitting base drive to said first transistor to place said first transistor in said conducting state, thereby providing drive to said relay coil, whereby the control switch controls on/off operation of the tool by switching the external alternating-current power source rather than the direct-current power to the tool.

14. The control system of claim 12 wherein said switch means includes a manually operable reset switch connected to said silicon-controlled rectifier for resetting said silicon-controlled rectifier.

15. The control system of claim 12 wherein the sensor means is a Zener diode connected across the transformed alternating-current power and the gate of said silicon-controlled rectifier is connected to said Zener diode, said Zener diode being selected with a breakdown voltage to provide sufficient voltage on the gate of said silicon-controlled rectifier to place said silicon-controlled rectifier in said conducting state when the voltage level of the transformed alternating-current power increases above said predetermined level.

16. A control system for electrically powering from an external alternating-current power source, a hand-operated, direct-current submersible tool activated by a control switch comprising:

a relay selectively controllable for connecting and disconnecting the external alternating-current power source to and from the system;

a transformer connected to the external alternating-current power source through the relay for transforming the alternating-current power of the source to a desired lower voltage level;

a first AC-to-DC rectifier connected to the transformer for rectifying the transformed alternating-current power to direct-current power to be supplied to the tool;

a second AC-to-DC rectifier connected to the transformer for rectifying the transformed alternating-current power to direct-current power for controlling the operation of the system;

a sensor connected to the second rectifier for sensing the voltage level of the direct-current power of the second rectifier, which corresponds to the voltage level of the transformed alternating-current power output of the transformer, and in response thereto, indicating the sensed voltage level increasing above a predetermined level;

a silicon-controlled rectifier responsive to the voltage level sensor, the silicon-controlled rectifier being held in a nonconducting state when the sensed voltage level is below said predetermined level, and the silicon-controlled rectifier being placed into a conducting state when the sensed voltage level increases above said predetermined level;

a switching transistor responsive to the conductive state of said silicon-controlled rectifier, the transistor controlling the relay to connect the external alternating-current power source to the system when the silicon-controlled rectifier is in a nonconducting state, and to disconnect the external alternating-current power source from the system when the silicon-controlled rectifier is placed into a conductive state; and a manually operated reset connected to said silicon-controlled rectifier for resetting said silicon-controlled rectifier from said conducting state to said nonconducting state.

17. The control system of claim 16, further including a second transistor responsive to the control switch of the tool and connected to said first transistor, when the control switch is positioned to turn off the tool, said second transistor causing said first transistor to control said relay to disconnect the external alternating-current power from the system, and when the control switch is positioned to turn on the tool, said second transistor causing said first transistor to control said relay to connect the external alternating-current power to the system, whereby the control switch controls on/off operation of the tool by switching the external alternating-current power source rather than the direct-current power to the tool.

18. The control system of claim 16, further including a filter for filtering low-current transients on the alternating-current power output of said transformer with voltage levels above said predetermined level to reduce said sensor from sensing such transients and in response thereto causing disconnection of the external current power source from the system.

19. A control system for electrically powering from an external alternating-current power source, a hand-operated, submersible light or tool activated by a control switch, comprising:

power switching means selectively controllable for connecting and disconnecting the external alternating-current power source to and from the system;

transformer means connected to said power switching means for transforming the alternating current power of the source to a desired lower voltage level;

conductive means for supplying the power to the tool; and control means for sensing the voltage level of the transformed alternating-current power, and in response to the sensed voltage level increasing above a predetermined level, for controlling said power switching means to disconnect the external alternating-current power source from the system, said control means including sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level, said switch means including a transistor and a silicon-controlled rectifier, said silicon-controlled rectifier being held in a nonconducting state when the voltage level of the transformed alternating-current power is below said predetermined level and said transistor in response thereto controlling said power switching means to connect the external alternating-current power source to the system, and said silicon-controlled rectifier being placed into a conducting state when the sensed voltage level increases above said predetermined level and said transistor in response thereto controlling said power switching means to disconnect the external alternating-current power source from the system, said silicon-controlled rectifier being held in said conducting state until reset to said nonconducting state, whereby the lower voltage alternating-current output of said transformer means is monitored and used to control the application of the higher voltage alternating-current to the system to prevent overvoltages on the output of said transformer means and thus the tool.

20. The control system of claim 19 wherein said switch means includes a manually operable reset switch connected to said silicon-controlled rectifier for resetting said silicon-controlled rectifier.

21. The control system of claim 19 wherein the sensor means is a Zener diode connected across the transformed alternating-current power of said transformer means and the gate of said silicon-controlled rectifier is connected to said Zener diode, said Zener diode being selected with a breakdown voltage to provide sufficient voltage on the gate of said silicon-controlled rectifier to place said silicon-controlled rectifier in said conducting state when the voltage level of the transformed alternating-current power increases above said predetermined level.

22. A control system for electrically powering from an external alternating-current power source, a hand-operated, submersible light or tool activated by a control switch, comprising:

power switching means selectively controllable for connecting and disconnecting the external alternating-current power source to and from the system, said power switching means including a normally open relay with a relay coil;

transformer means connected to said power switching means for transforming the alternating current power of the source to a desired lower voltage level;

conductive means for supplying the power to the tool; and control means for sensing the voltage level of the transformed alternating-current power, and in response to the sensed voltage level increasing above a predetermined level, for controlling said power switching means to disconnect the external alternating-current power source from the system, said control means including sensor means for sensing the voltage level of the transformed alternating-current power of said transformer means, and switch means responsive to said sensor means for controlling said power switching means, said switch means disconnecting the external alternating-current power source from the system in response to said sensor means sensing the voltage level of the transformed alternating-current power increasing above said predetermined level, said switch means including a transistor connected to said relay coil to selectively provide drive thereto and a silicon-controlled rectifier connected to the base of said transistor, said silicon-controlled rectifier being held in a nonconducting state when the sensed voltage level of the transformed alternating-current power of said transformer means is below said predetermined level and being placed into a conducting state when the sensed voltage level increases above said predetermined level, when in said nonconducting state, said silicon-controlled rectifier permitting base drive to said transistor to place said transistor in a conducting state for providing drive to said relay coil to maintain said relay closed and the external alternating-current power source connected to the system, and when in said conducting state, said silicon-controlled rectifier inhibiting base drive to said transistor to place said transistor in a nonconducting state for eliminating drive to said relay coil to open said relay and disconnecting the external alternating-current power source from the system, said silicon-controlled rectifier being held in said conducting state and said transistor thereby being latched in said nonconducting state until said silicon-controlled rectifier is reset to said nonconducting state, whereby the lower voltage alternating-current output of said transformer means is monitored and used to control the application of the higher voltage alternating-current to the system to prevent overvoltages on the output of said transformer means and thus the tool.

23. The control system of claim 22, further including a second transistor responsive to the control switch of the light or tool and connected to the base of said first transistor, said second transistor being held in a conducting state when the control switch is positioned to turn off the light or tool for inhibiting base drive to said first transistor to place said first transistor in said nonconducting state, thereby eliminating drive to said relay coil, and said second transistor being placed in a nonconductive state when the control switch is positioned to turn on the light or tool for permitting base drive to said first transistor to place said first transistor in said conducting state, thereby providing drive to said relay coil.

24. The control system of claim 22 wherein said switch means includes a manually operable reset switch connected to said silicon-controlled rectifier for resetting said silicon-controlled rectifier.

25. The control system of claim 22 wherein the sensor means is a Zener diode connected across the transformed alternating-current power and the gate of said silicon-controlled rectifier is connected to said Zener diode, said Zener diode being selected with a breakdown voltage to provide sufficient voltage on the gate of said silicon-controlled rectifier to place said silicon-controlled rectifier in said conducting state when the voltage level of the transformed alternating-current power increases above said predetermined level.

* * * * *